United States Patent [19]

Neijzen et al.

[11] Patent Number: 5,539,288
[45] Date of Patent: Jul. 23, 1996

[54] FOOD PROCESSOR WITH AUTOMATIC STOP AND SIGNAL PROCESSING UNIT WITH DIFFERENTIATING MEANS FOR TORSION SIGNAL

[75] Inventors: Jacobus H. M. Neijzen; Willem L. N. Van Der Sluijs; Johannes J. Van Herk; Petrus W. L. De Roo, all of Eindhoven, Netherlands

[73] Assignee: U.S. Philips Corporation, New York, N.Y.

[21] Appl. No.: 10,891

[22] Filed: Jan. 29, 1993

[30] Foreign Application Priority Data

Feb. 4, 1992 [EP] European Pat. Off. .............. 92200317

[51] Int. Cl.⁶ ...................................................... H02P 3/00
[52] U.S. Cl. .................................... 318/432; 318/434
[58] Field of Search ............................. 318/432, 488, 318/434, 254, 132, 439; 361/23, 30, 31, 78, 87; 307/124, 126, 131

[56] References Cited

U.S. PATENT DOCUMENTS

| | | | |
|---|---|---|---|
| 3,965,407 | 6/1976 | Stoner | 318/432 |
| 4,013,895 | 3/1977 | Akiyoshi et al. | 307/126 |
| 4,515,020 | 5/1985 | Plaquin | 73/761 |
| 4,608,524 | 8/1986 | Yokobori | 318/254 |
| 4,611,682 | 9/1986 | Yasuda et al. | 318/488 X |
| 5,223,778 | 6/1993 | Svarovsky et al. | 318/610 |
| 5,253,725 | 10/1993 | Nishimoto | 180/79.1 |

FOREIGN PATENT DOCUMENTS

| | | |
|---|---|---|
| 0382275 | 1/1990 | European Pat. Off. . |
| 217697 | 1/1923 | Germany . |

*Primary Examiner*—Anthony Wysocki
*Attorney, Agent, or Firm*—Ernestine C. Bartlett

[57] ABSTRACT

A food processor is provided having a motor (18), a bowl (10) and a beater (12) which are movable relative to each other by a drive by the motor (18), a switching means (48) for switching the motor (18) on and off under the control of a start signal (START) and at least a first stop signal (STOP1) respectively, torsion measuring means (28/30, 32/34) for producing a torsion signal (TS) which is a measure for the torque necessary for the drive, a signal processing unit (42) for producing at least the first stop signal (STOP1) in response to the torsion signal (TS). The signal processing unit (42) includes a first differentiator (56) and/or a second differentiator (58) for producing the first (DTS) and the second derivative (DDTS) of the torsion signal (TS) and a comparator (62) in which the first (DTS) or second (DDTS) derivative is compared with a reference value (REF1). When the reference value is exceeded, the comparator produces a stop signal (STOP1) to switch off the motor (18). The food processor stops by itself once a predetermined bending point in the torsion signal (TS) occurs, so that it becomes possible to whip cream of varying quantity, quality and composition without supervision.

20 Claims, 5 Drawing Sheets

FOOD PROCESSOR WITH AUTOMATIC STOP AND SIGNAL PROCESSING UNIT WITH DIFFERENTIATING MEANS FOR TORSION SIGNAL

FIELD OF THE INVENTION

The invention relates to a food processor comprising a motor, a bowl and a beater which are movable relative to each other by a drive by the motor, a switching device for switching the motor on and off under the control of a start signal and at least a first stop signal respectively, torsion measuring means for producing a torsion signal which is a measure for a torque necessary for the drive, a signal processing unit for producing at least the first stop signal in response to the torsion signal.

BACKGROUND OF THE INVENTION

A food processor of this type is known from Patent Specification DD 217 697 A1 of the former German Democratic Republic. When cream is whipped with a food processor or mixer, there is a problem that it is hard to establish beforehand how long the cream has to be whipped to obtain a good final result. If cream whipping is stopped early, this will result in too soft whipped cream with a relatively large amount of moisture leaking out. If cream whipping is continued for too long, an irreversible process will occur in which the whipped cream rather abruptly turns into an undesired mixture of butter and skimmed milk. For a good result the whipped cream must satisfy specific quality standards. An important indicator is the volume expansion factor, that is to say, the volume expansion of the cream during whipping as a result of air inclusion. The volume expansion factor is to be about 100%. Another indicator is the moisture leakage, that is to say, the quantity of moisture leaking out of the whipped cream during a specific period of time and at a specific temperature. A high quality of whipped cream is attended by minimum moisture leakage. When the cream is being whipped it becomes ever firmer and there is a relation between the mechanical torque or the torsion necessary for cream whipping and the time elapsed. The torque time curve may coarsely be subdivided into three stages. A first stage in which the torque remains relatively low and hardly increases, a second stage in which the torque increase becomes ever steeper until a maximum torque is reached and, finally, a third stage in which the torque erratically decreases again and in which the whipped cream rather rapidly turns into butter and skimmed milk. Now it appears that if cream whipping is stopped when the maximum of the torque time curve is reached, whipped cream is obtained having minimum moisture leakage and maximum firmness. If cream whipping is stopped before the maximum is reached, a softer whipped cream is obtained which has a larger volume expansion factor and a rather large moisture leakage. The right moment to stop cream whipping depends on the user's personal preference. For soft and light cream the ideal moment lies somewhere in the steeply ascending range of the torque time curve, whereas to stop the cream whipping at the maximum of the curve will produce a firm whipped cream having little moisture leakage.

A number of methods are possible to stop cream whipping automatically at a fight moment. A first method is based on setting a fixed beating time. However, this method turns out to be insufficiently accurate for cream whipping, because the necessary period of time depends on, for example, the composition and freshness of the cream, the temperature of the cream and addition, if any, of sugar to the cream. A second method is known from the above referred to Patent Specification which discloses a food processor in which the firmness of a food mass is verified by measuring the torque necessary for driving the beater. As an indication for the torque either the motor current is measured or a torque measuring device is used in the mechanical transmission from the motor to the beater. Then a torsion signal is produced whose instantaneous value is compared at regular intervals with a Table of values stored in a non-volatile memory by a signal processing unit, which values are characteristic of the food mass. Once the torque has reached a specific value, the motor of the food processor is stopped. However, the comparison with a Table of characteristic values is not suitable as a criterion for stopping the cream whipping. As a result of the specific properties and composition of cream, such a Table can only be used if the composition, freshness, temperature and quantity of cream to be whipped correspond with the cream of the Table of characteristic values. However, in practice this is hardly ever the case.

SUMMARY OF THE INVENTION

An object of the invention is to provide a food processor having an automatic stop, which processor is suitable for whipping cream that has varying properties. More specifically, a food processor according to the invention of the type mentioned in the opening paragraph is characterized, in that the signal processing unit comprises: first differentiating means for differentiating the torsion signal and for producing a once differentiated torsion signal, first comparing means for comparing a decision signal with a reference signal and for producing the first stop signal if the decision signal exceeds the reference signal, and in that the once differentiated torsion signal functions as the decision signal.

By utilizing the torsion signal that has been differentiated once, the maximum of the torque time curve may be determined during the cream whipping without there being determined in advance when and at which value of the torsion signal this maximum occurs. When the maximum is reached, the once differentiated torsion signal crosses zero. This is detected by the first comparing means and signalled in that the stop signal to stop the motor is generated. The reference signal may be selected as desired, so that the once differentiated torsion signal is to pass a non-zero value, so that the motor stops, for example, slightly before the maximum.

The maximum of the torque time curve is not always as pronounced. This turns out to be the case especially when larger quantities of cream are whipped. Yet to present a suitable stop criterion, the food processor according to the invention is further characterized, in that the signal processing unit further includes: second differentiating means for differentiating once again the once differentiated torsion signal of the first differentiating means and for producing a twice differentiated torsion signal, and in that the twice differentiated torsion signal in lieu of the first differentiated signal functions as the decision signal.

With the twice differentiated torsion signal there is determined when the torque time curve shows a bending point in the second stage. In that case the twice differentiated torsion signal crosses zero. This is detected by comparing the twice differentiated torsion signal with a reference value which may again be shifted as required, to advance or delay the stop signal relative to the occurrence of the bending point. An additional advantage of the detection of the bending point as a stop criterion is that there is extra time available to filter off noise and interferences in the torsion signal and the differentiated torsion signal. The time difference between the occurrence of the bending point and the maximum in the torque time curve may be taken up by the delay of filters without the most critical stop instant being passed. The filters then admit torsion signals which have relatively large interference and noise components, such as may be the case with torsion signals produced on the basis of motor current measurement.

Nevertheless, undesired zero crossings as a result of interference and noise may occur in the twice differentiated torsion signal. In order to emphasize the desired zero crossing, the food processor according to the invention is further characterized, in that the signal processing unit further includes: a multiplier means for multiplying the once differentiated torsion signal of the first differentiating means by the twice differentiated torsion signal of the second differentiating means and for producing a product signal which is the result of the multiplication, and in that the product signal in lieu of the twice differentiated signal functions as the decision signal.

When the bending point occurs, the once differentiated torsion signal is relatively large and is not sign inverted. By multiplying the twice differentiated torsion signal by the once differentiated torsion signal a product signal will be developed having a marked zero crossing. This is detected by a comparison of the product signal with the reference value which may again be shifted, as required, to advance the stop signal, or delay same relative to the occurrence of the bending point.

The selectivity of the detection of the bending point may be improved still further. For this purpose, the food processor according to the invention is still further characterized, in that the multiplier means comprises processing means for processing the once and twice differentiated torsion signals, as a result of which the product signal only differs from zero if the once differentiated torsion signal has a value corresponding to an increase of the torsion signal and, besides, the twice differentiated torsion signal has a value corresponding to a decrease of the once differentiated torsion signal.

There may be conditions in which said stop criterions are not satisfactory because the torque necessary for cream whipping does not increase as a function of time. This happens, for example, if the cream to be whipped is too warm or of poor quality. In that case too the food processor is desired to stop automatically. For this purpose, the food processor according to the invention is further characterized, in that the signal processing unit further includes: means for producing a second stop signal after elapse of a first predetermined time interval which starts running when the start signal occurs. As a result, the whipping of the cream will automatically stop after the first predetermined time interval, irrespective of further working conditions.

As has already been observed hereinbefore, the right moment to stop cream whipping depends on the user's personal preference. For soft and light cream the ideal instant lies somewhere in the steeply ascending zone of the torque time curve, whereas to stop at the maximum of the curve results in a firm whipped cream with little moisture leakage. Thus, the user has some play for adjusting the whipping of the cream to taste. An embodiment of the food processor according to the invention is therefore characterized, in that the signal processing unit further includes:

second comparing means for comparing the torsion signal with a second reference signal and for producing a third stop signal if the torsion signal exceeds the second reference signal. This arrangement provides that the whipping of the cream is automatically stopped if during the whipping of the cream a torsion value to be set by the user is exceeded. For that very reason, this arrangement combined with the automatic stop criterions mentioned hereinbefore is useful, because the aforementioned criterions eliminate a possible failure of the last-mentioned criterion. For that matter, the user is to make an estimation on the basis of, for example, the quantity and quality of the cream to be whipped. This estimation may be wrong. The food processor according to the invention will nevertheless automatically stop when an acceptable quality of whipped cream is obtained.

Another embodiment of a food processor according to the invention is characterized, in that the signal processing unit further includes storage means for storing a background signal which has a value corresponding to an instantaneous value of the torsion signal during a second predetermined time interval which starts running when the start signal occurs, and a differential amplifier for producing a corrected torsion signal which is the difference between the torsion signal and the background signal, while the corrected torsion signal substitutes for the torsion signal after the second predetermined time interval has elapsed.

As a result, the background noise in the torsion signal is largely removed from the torsion signal. This is especially advantageous if the current consumed by the motor is taken as a measure for the torsion signal. Such a torsion signal contains a relatively large DC component which does not provide information on the change of torsion. By removing the DC component the remaining torsion signal may be processed very accurately within the available signal range of the signal processing unit. In that case the aforementioned torsion that can be adjusted by the user is also advantageously related to the corrected torsion signal, as a result of which the cream whipping is automatically stopped if a torsion increase relative to the background signal is exceeded.

BRIEF DESCRIPTION OF THE DRAWINGS

These and other aspects of the invention will be described and explained with reference to the appended drawing, in which.

Figure 1:
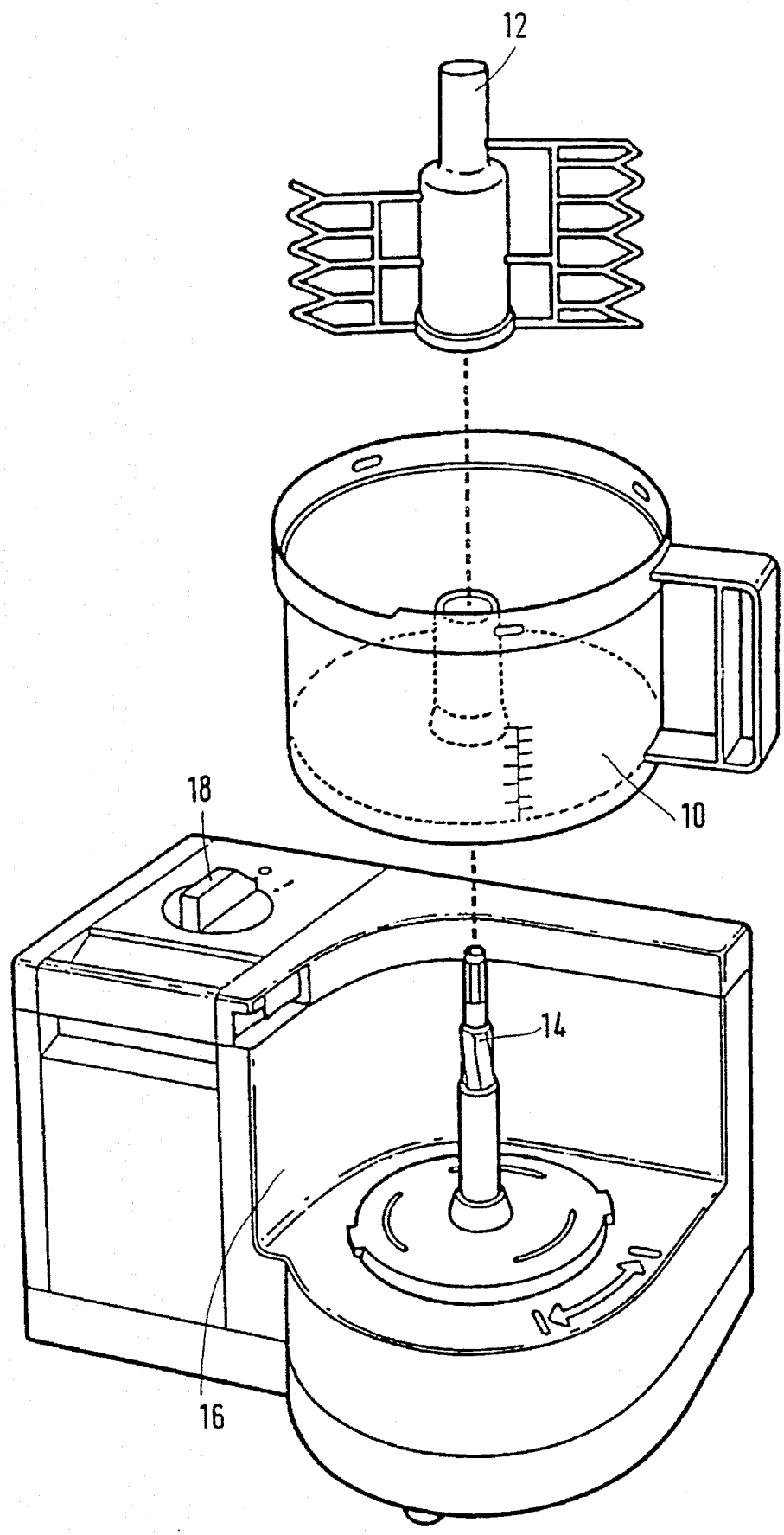
FIG. 1 shows a food processor of a known for example, a Philips HR 2881, in which components may be installed for allowing the food processor to operate as a food processor according to the invention.
Figure 5:
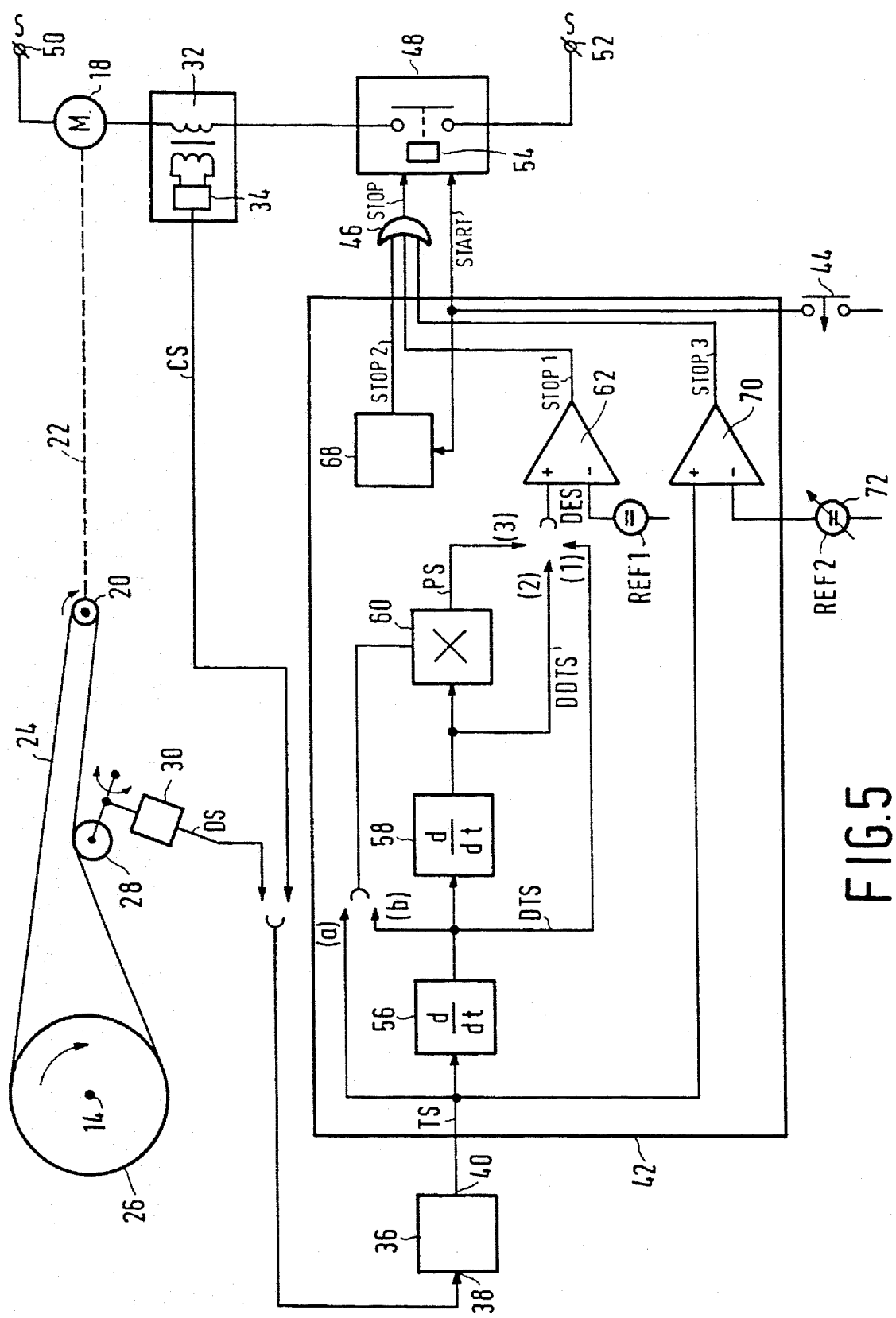
Figure 6:
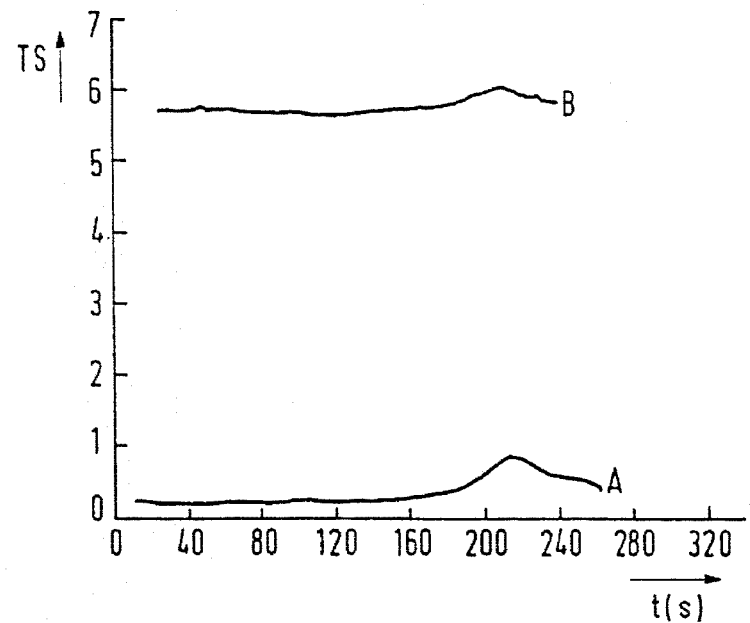
Figure 7:
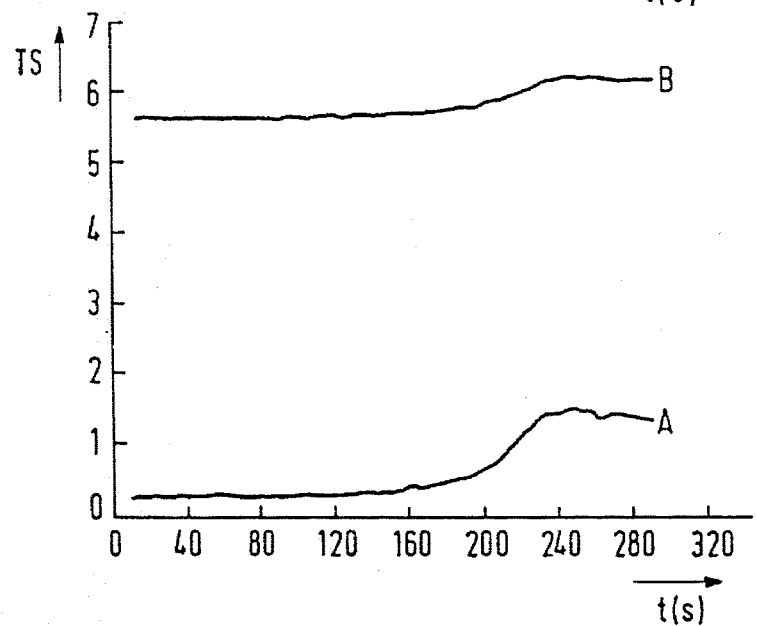
Figure 9:
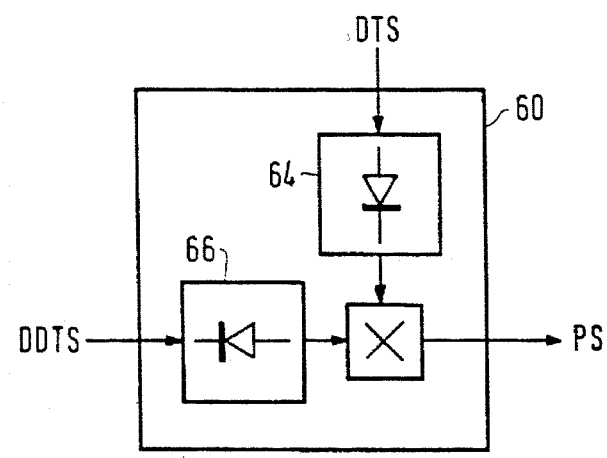
Figure 8:
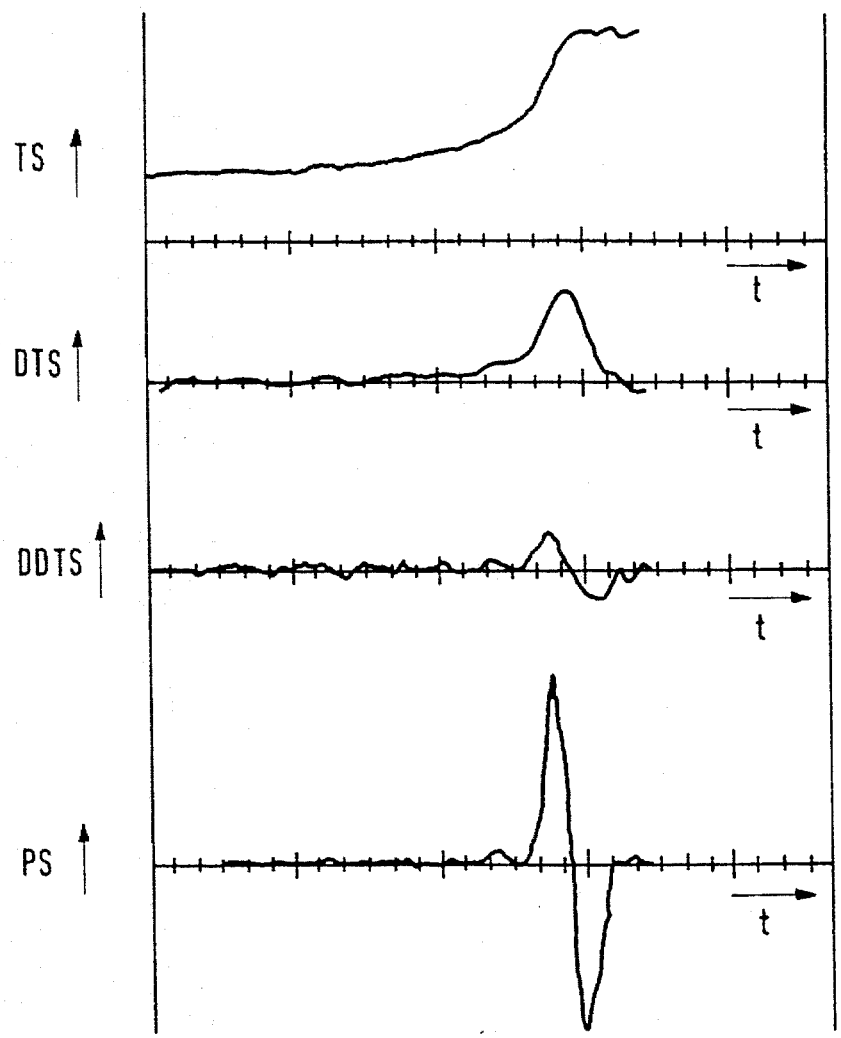
Figure 10:
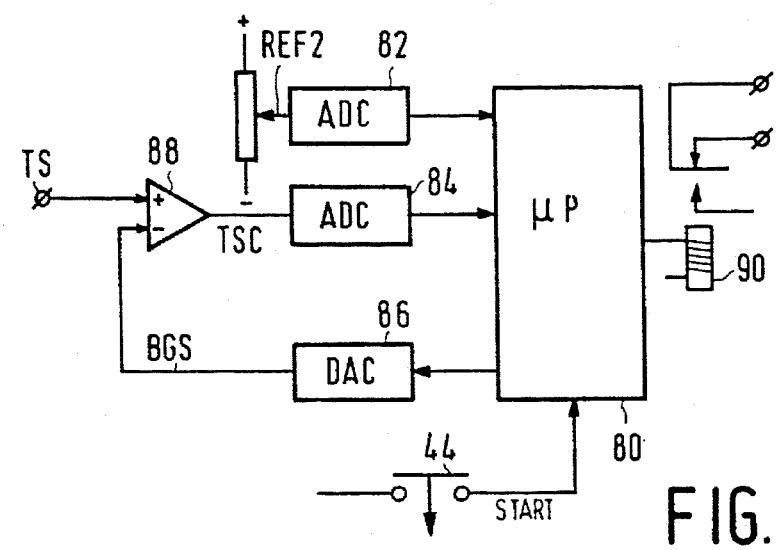

an A stop on the basis of an adjustable torque or on the basis of a torque increase that can be adjusted relative to a minimum torque a B1 and B2 stop on the basis of a bending point and a peak respectively, in the curve, and a C stop on the basis of an elapsed period of time;

FIG. 5 shows an electric block diagram of a food processor according to the invention;

FIG. 6 shows torsion signals for whipping 250 ml of cream with the food processor shown in FIG. 1, where curve A represents a torsion signal based on a measurement of the tension in the drive belt and where curve B represents a torsion signal based on the motor current;

FIG. 7 shows torsion signals for whipping 500 ml of cream with the food processor shown in FIG. 1, where curve A represents a torsion signal based on a measurement of the tension of the drive belt and where curve B represents a torsion signal based on the motor current;

FIG. 8 shows diagrams of signals occurring in a food processor according to the invention;

FIG. 9 shows a further elaboration of a section of the electric block diagram shown in FIG. 5, and FIG. 10 shows a diagram of an embodiment of a section of the electric block diagram shown in FIG. 5.

In these drawing Figures like components having like reference characters have like functions or connotations.

DETAILED DESCRIPTION OF PREFERRED EMBODIMENTS

FIG. 1 shows a food processor of a known type, for example a Philips HR 2881, suitable, for example, for cream whipping. From the food processor only those elements are shown which are necessary for explaining the invention. There are present a bowl 10, into which the cream to be whipped is poured, a beater 12 which can carry out a rotary movement in the bowl 10, a shaft 14 which drives the beater 12 and a motor (not shown) which drives the shaft 14 and is accommodated in the motor housing 16. The motor is operated by a switch 18.

Figure 2:
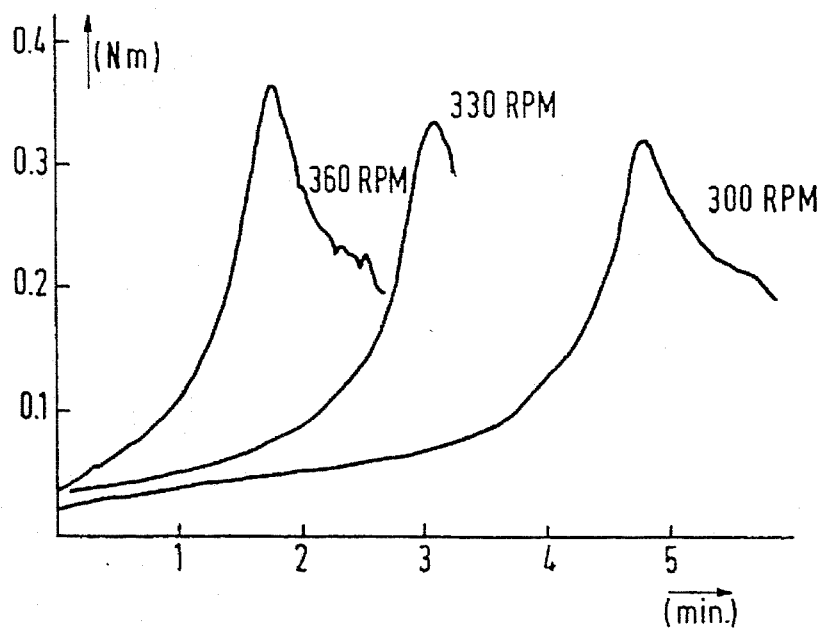
FIG. 2 shows typical results of torsion measurements made with the food processor shown in FIG. 1 during the whipping of 250 ml of cream at 300, 330 and 360 revolutions of the beater per minute.
Figure 3:
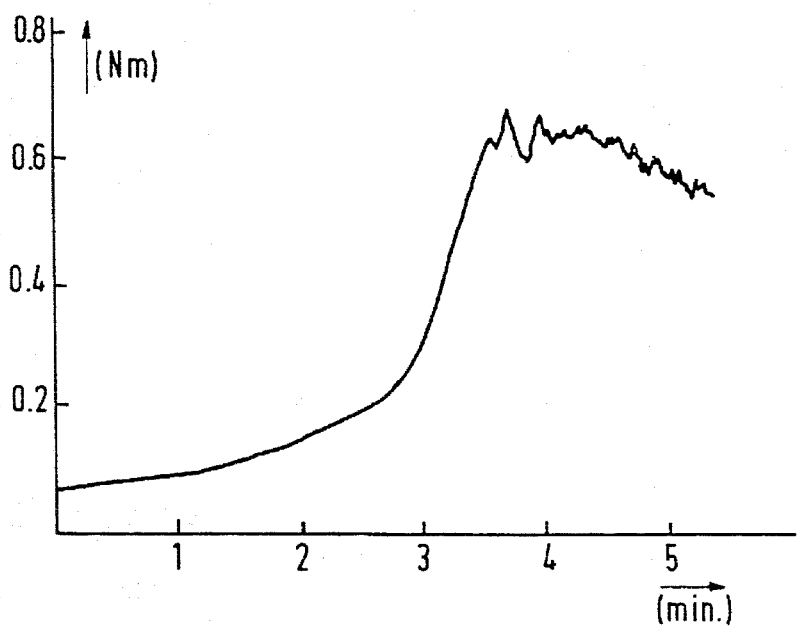
FIG. 3 shows the typical result of a torsion measurement made with the food processor shown in FIG. 1 during the whipping of 500 ml of cream at 330 revolutions of the beater per minute.

When cream is whipped, it is not known in advance how long the cream is to be whipped for obtaining a good final result. If cream whipping is stopped early, this will result in whipped cream that is too soft with relatively large amounts of moisture leaking out. If cream whipping is continued for too long, an irreversible process will occur in which the whipped cream rather abruptly turns into an undesired mixture of butter and skimmed milk. For a good result the whipped cream is to satisfy specific quality standards. An important indicator is the volume expansion factor, that is to say, the volume expansion of the cream as a result of air inclusion during whipping. The volume expansion factor is to be about 100%. Another indicator is the moisture leakage, that is to say, the quantity of moisture leaking out of the whipped cream during a specific period of time and at a specific temperature. A high quality of whipped cream is attended by minimum moisture leakage. When the cream is being whipped it becomes ever firmer and there is a relation between the mechanical torque or the torsion necessary for cream whipping and the time elapsed. This relation is measured in the aforementioned known food processor. FIG. 2 shows the relation between the elapsed time and the required torque which the beater 12 is to exert for whipping 250 ml of cream to whipped cream at 300, 330 and 360, revolutions of the beater per minute (RPM) respectively. In reality, the RPM slightly decreases with increasing firmness of the cream, but this is not essential to the operation and the effect of the invention. The torque time curve may coarsely be subdivided into three stages. A first stage in which the torque remains relatively low and hardly increases, a second stage in which the torque increase becomes ever steeper until a maximum torque is reached and, finally, a third stage in which the torque erratically decreases again and in which the whipped cream rather rapidly turns into butter and skimmed milk. The curves show that at 300 RPM the first stage lasts longer than at 330 RPM. However, if the RPM is raised to 360 RPM, the first stage is substantially skipped and the torque starts increasing immediately. As will appear from the further explanation, a specific minimum duration of the first stage is desired for being able to make a more accurate estimation of the torque time curve. For this food processor a number of beater revolutions of about 330 per minute is a good choice. FIG. 3 shows a torque time curve for 500 ml of cream at 300 RPM. The differences with the curve of 250 ml at 330 RPM of FIG. 2 are that the torque is higher and that the decrease of the torque once the maximum value has been reached is less pronounced. Nevertheless, there is a rather abrupt change from cream into butter and skimmed milk here too once the maximum torque has been reached. Said quantities of cream are typical of the food processor and are related to the contents of the bowl 10. As a result of the volume expansion factor the volume strongly increases. More than 500 ml of cream would in the end run over the edge of the bowl 10. Less than 250 ml is possible, it is true, but as a result of the whipping the cream will end up on the wall of the bowl 10 as a mass that is hard to remove.

The curves of FIGS. 2 and 3 already show that a fixed time setting as a criterion for automatically stopping the cream whipping is very inaccurate (time criterion). For avoiding undesired butter formation, the cream whipping is to stop slightly before or when the maximum torque of the torque time curve is reached. For different quantities this maximum is reached at different instants. Further parameters are the RPM during the whipping of the cream, the temperature, freshness and pH value of the cream and the addition, if any, of sugar to the cream.

The invention provides criterions for automatically stopping the cream whipping while the above variables which are hard to gauge do not substantially play a role. This is done by continuously measuring the change of the torque as a function of time and detecting specific characteristic points of the torque time curve on the basis of these measurements: bending point criterion. Such characteristic points are the peak of the curve, when the first derivative of the torque time curve crosses zero, and the bending point just before the peak, when the second derivative of the torque time curve crosses zero. Furthermore, measurements have shown that if cream whipping is stopped when the maximum of the torque time curve is reached, whipped cream is obtained having minimum moisture leakage and optimum firmness. If cream whipping is stopped before the maximum has been reached, softer cream will be obtained having a larger volume expansion factor and a little more leakage. The exact instant to stop whipping the cream depends on the user's personal preference. For soft and light cream the ideal instant lies somewhere in the steeply ascending area of the torque time curve (second stage), whereas firm whipped cream having little leakage is the result of a stop at the peak of the curve.

To offer the user the possibility to stop the cream whipping when a specific firmness is reached in the second stage, the invention provides, in addition to said criterions on the basis of torque change, a criterion on the basis of the torque itself to stop the whipping of the cream: torque criterion. The latter criterion as such is inaccurate for the same reasons as given above for the time criterion. In combination with the bending point criterion, however, a reliable stop system is obtained, because when the torque criterion fails, for example because the user has made a wrong estimation of the quantity of cream, the food processor nevertheless stops on the basis of the bending point criterion when a specific firmness is reached. Although the firmness expected by the user may not have been reached, still the whipping of the cream is automatically stopped when a fully acceptable cream quality is reached.

If too warm cream or poor quality cream (for example, stale cream) is whipped, the required torque appears not to increase noticeably. The food processor would then never stop automatically. For exceptional cases like these the time criterion may render good services. Therefore, the invention provides as an automatic emergency stop a timer circuit switching off the motor after a fixed period of time. This period of time is related to the food processor used and is about 5 minutes for the above known device.

Figure 4:
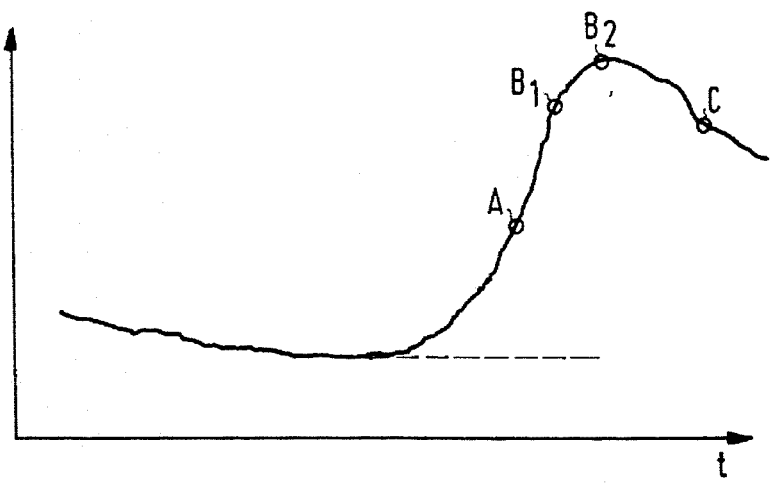
FIG. 4 shows a torque time curve of a torsion signal and the different stop criterions for automatically stopping the whipping of the cream in a food processor according to the invention including.

FIG. 4 shows a torque time curve of a torsion signal showing the three different stop criterions for automatically terminating the whipping of cream in a food processor according to the invention. In this diagram, A represents a stop on the basis of the torque criterion; the torque can be adjusted within certain limits. B1 and B2 represent a stop on the basis of a bending point and a peak in the curve respectively, and C represents a stop on the basis of an elapsed period of time.

The available measured data about the elapsed period of time, the torque behaviour and the user's setting may be interrelated, as desired, by means of fuzzy logic in the signal processing unit to be discussed hereinafter. In addition, or instead, the torque criterion and the time criterion may be rendered dependent on variables such as temperature and weight (quantity) of the cream to be whipped and the beater or bowl to be used. The food processor is to comprise additional sensors for measuring the temperature of the cream, for measuring the weight of the filled bowl and for signalling the beater and bowl used. In the signal processing unit the output of the additional sensors may be taken into consideration for determining the response values of the various criterions.

FIG. 5 shows the electric block diagram of the food processor according to the invention. A motor gear or motor pulley 20 on the shaft 22 of a motor 18 drives, by means of a belt 24, a beater gear or beater pulley 26 which, in turn, is attached to the shaft 14. The torsion necessary for beating is measured by a torque meter comprising a pressure roller 28 pressed against the belt 24 and a displacement transducer 30 which transforms the movement of the pressure roller 28 into an electric displacement signal DS. The measured displacement is a measure for the torsion exerted on the belt 24. The displacement transducers may be arranged as a magnet attached to the pressure roller 28, and a stationary Hall element. Optical, resistive or inductive displacement transducers are likewise possible. Another method of measuring the torque required is measuring the electric motor current, for example, with the aid of a transformer 32 combined in series with the motor 18. The secondary voltage of the transformer is transformed by way of an interface 34 into an electric current signal CS which is a measure for the motor current and, indirectly, for the torque required. Advantages of torque measurement on the basis of the motor current are that no additional mechanical parts are necessary and that a direct drive of shaft 14 by the motor 18 is possible. On the other hand, the current signal CS comprises a relatively large background component as a result of to the no-load current required by the motor and the mechanical transmission. The food processor may optionally comprise one of the torque measuring means shown. The displacement signal DS or the current signal CS is applied to an input 38 of an optional low-pass filter 36 to cancel interference and noise. The torsion signal TS is available on an output 40 of the filter 36. FIG. 6 gives an impression of the torsion signal TS, a Butterworth filter having a cut-off frequency of about 0.3 Hz being selected for the low-pass filter 36. Curve A shows a torsion signal on the basis of the displacement signal DS, curve B on the basis of the current signal CS as obtained when whipping 250 ml of cream. FIG. 7 shows similar curves A and B of torsion signals, but then for 500 ml of cream. The vertical axis in the FIGS. 6 and 7 is subdivided into arbitrary units and merely serves for comparison.

The electrical block diagram of the food processor further includes a signal processing unit 42 in which one or more stop signals STOP1, STOP2, STOP3 are produced on the basis of the torsion signal TS and in which a start signal START is generated in response to a key or switch 44. The stop signals are combined in a logic OR gate 46 to a stop signal STOP. By way of an interface 54, a switching means 48 makes and breaks the electrical connection of the motor 18 to supply-terminals 50 and 52 in response to the start signal START and the stop signal STOP respectively. The signal processing unit 42 comprises a series combination of first differentiating means (first differentiator) 56 producing a once differentiated torsion signal $DTS=dTS/dt$, second differentiating means (second differentiator) 58 producing a twice differentiated torsion signal $DDTS=d^2TS/dt^2$, and a multiplier means (multiplier) 60 producing a product signal PS which is the product of either (a) the torsion signal TS or (b) the once differentiated torsion signal DTS and the twice differentiated torsion signal DDTS. In first comparing means (first comparator) 62 a decision signal DES is compared with a first reference signal REF1. Once the decision signal DES has exceeded the first reference signal REF1, the first comparator 62 produces the first stop signal STOP1. The following signals may optionally function as the decision signal: (1) the once differentiated torsion signal DTS, for which the zero crossing of the first derivative of the torsion signal is decisive for producing the first stop signal STOP1, (2) the twice differentiated torsion signal DDTS, for which the zero crossing of the second derivative of the torsion signal is decisive, or (3) the product signal PS, for which, for option (b) that is, the zero crossing of the product of the first and second derivatives of the torsion signal is decisive. In the third case the desired zero crossing in the twice differentiated torsion signal DDTS is especially distinct relative to undesired zero crossings as a result of noise. All this is illustrated in FIG. 8. An even greater selectivity may be obtained by means of a modified multiplier 60, represented in FIG. 9, in which from the once differentiated torsion signal DTS only the positive portions are taken by means of a positive signal port 64 and from the twice differentiated torsion signal DDTS only the negative portions are taken by means of a negative signal port 66 before the signals are multiplied by each other.

It should be observed that the second differentiator 58 and the multiplier 60 may be omitted if the once differentiated torsion signal DTS functions as the decision signal DES. The multiplier 60 may be omitted if the twice differentiated torsion signal DDTS functions as the decision signal DES.

For the automatic emergency stop (time criterion) the signal processing unit 42 comprises a timer 68 for producing the second stop signal STOP2 which occurs a predetermined period of time, for example 5 minutes, after the occurrence of the start signal START. Also inserted are the second comparing means (second comparator) 70 for producing the third stop signal STOP3 on the basis of a comparison of the torsion signal TS with a second reference signal REF2. The reference signal REF2 may be adjustable as desired and offers the user the possibility to stop the food processor once a specific firmness of the whipped cream has been reached (torque criterion).

The building blocks shown in FIG. 5 for producing and further processing the torsion signal TS, the remaining electronic components in the signal processing unit 42 and the switching means 48 may be arranged in hardware known to a person skilled in the art. The necessary functions, however, may also be performed with the aid of a microprocessor which performs, under the control of a program, the functions and differentiating operations in response to a digitized version of the torsion signal TS.

FIG. 10 shows a block diagram of an embodiment of the signal processing unit 42. A microprocessor 80 receives a second reference signal REF2 digitized by means of a first analog-to-digital converter (ADC) 82, a corrected torsion signal TSC digitized by means of a second ADC 84 and the start signal START. The microprocessor 80 produces a digital signal which is converted into an analog background signal BGS by means of a digital-to-analog converter (DAC) 86. In an analog differential amplifier 88 the background signal BGS is subtracted from the torsion signal TS. The difference between the two signals is the corrected torsion signal TSC which is applied to the second ADC 84 by the differential amplifier 88. The microprocessor 80 further applies a control signal to a relay 90 for switching the motor on and off. Especially when a torsion signal TS derived from the motor current is used, a relatively large background signal is present as has already been shown in the drawing FIGS. 6 and 7 in curves B. It is advantageous for this background signal to be largely removed, so that the resolution of the utilized ADCs 82 and 84 and the DAC 86 can be used in the best way possible. The microprocessor 80 is programmed in such a way that for a certain period of time, for example, 30 seconds after the occurrence of the start signal START, the background signal BGS is varied in the first stage of the torque time curve until the corrected torsion signal TSC comes within a certain range. After this initial setting period the microprocessor 80 retains the background signal BGS during the further whipping of the cream.

The corrected torsion signal TSC is then actually substituted for the torsion signal TS. In the torque time curves and in the block diagram shown in FIG. 5 it is then the corrected torsion signal TSC that represents the torsion increase relative to the background signal BGS. This implies, for example, that the user can set point A in FIG. 4 (torque criterion) relative to the background signal BGS, which is shown there by a horizontal dashed line.

The twice differentiated torsion signal DDTS may, in lieu of the once differentiated torsion signal DTS, also be multiplied by the corrected torsion signal TSC. This is especially advantageous when the motor is started while being cold, when the torsion signal initially slightly decreases as the motor heats up. The corrected torsion signal TSC then has an opposite sign and this information may be used in similar fashion to that of the multiplication by the once differentiated torsion signal DTS to improve the reliability of the twice differentiated torsion signal DDTS. This is denoted in FIG. 5 by option (a).

The invention has been explained with reference to measurements and graphs relating to a specific type of food processor. However, the invention is not restricted to that type. For that matter, it will be evident to those skilled in the art that the invention may also apply in general to other types of food processors or household mixers with which cream can be whipped.

We claim:

1. A food processor comprising a motor (18), a bowl (10) and a beater (12) which are movable relative to each other by a drive by the motor (18), a switching device (48) for switching the motor (18) on and off under the control of a start signal (START) and at least a first stop signal (STOP1) respectively, torsion measuring means (28/30, 32/34) for producing a torsion signal (TS) which is a measure for a torque necessary for the drive, a signal processing unit (42) for producing at least the first stop signal (STOP1) in response to the torsion signal (TS), characterized in that the signal processing unit (42) comprises:

first differentiating means (56) for differentiating the torsion signal (TS) and for producing a once differentiated torsion signal (DTS), first comparing means (62) for comparing a decision signal (DES) with a reference signal (REF1) and for producing the first stop signal (STOP1) if the decision signal (DES) exceeds the reference signal (REF1), and in that the once differentiated torsion signal (DTS) functions as the decision signal (DES).

2. A food processor as claimed in claim 1, characterized in that the signal processing unit (42) further includes: second differentiating means (58) for differentiating once again the once differentiated torsion signal (DTS) of the first differentiating means (56) and for producing a twice differentiated torsion signal (DDTS), and in that the twice differentiated torsion signal (DDTS) in lieu of the once differentiated torsion signal (DTS) functions as the decision signal (DES).

3. A food processor comprising a motor (18), a bowl (10) and a beater (12) which are movable relative to each other by a drive by the motor (18), a switching device (48) for switching the motor (18) on and off under the control of a start signal (START) and at least a first stop signal (STOP1) respectively, torsion measuring means (28/30,32/34) for producing a torsion signal (TS) which is a measure for a torque necessary for the drive, a signal processing unit (42) for producing at least the first stop signal (STOP1) in response to the torsion signal (TS), characterized in that the signal processing unit (42) comprises: (a) first differentiating means (56) for differentiating the torsion signal (TS) and for producing a once differentiated torsion signal (DTS), first comparing means (62) for comparing a decision signal (DES) with a reference signal (REF1) and for producing the first stop signal (STOP1) if the decision signal (DES) exceeds the reference signal (REF1), (b) second differentiating means (58) for differentiating once again the once differentiated torsion signal (DTS) of the first differentiating means (56) and for producing a twice differentiated torsion signal (DDTS), and (c) a multiplier means (60) for multiplying the once differentiated torsion signal (DTS) of the first differentiating means (56) by the twice differentiated torsion signal (DDTS) of the second differentiating means (58) and for producing a product signal (PS) which is the result of the multiplication, and wherein the product signal (PS) functions as the decision signal (DES).

4. A food processor as claimed in claim 3, characterized in that the multiplier means (60) comprises processing means (64, 66) for processing the once (DTS) and the twice differentiated torsion signals (DDTS), as a result of which the product signal (PS) only differs from zero if the once differentiated torsion signal (DTS) has a value corresponding to an increase of the torsion signal (TS) and also the twice differentiated torsion signal (DDTS) has a value corresponding to a decrease of the once differentiated torsion signal (DTS).

5. A food processor comprising a motor (18), a bowl (10) and a beater (12) which are movable relative to each other by a drive by the motor (18), a switching device (48) for switching the motor (18) on and off under the control of a start signal (START) and at least a first stop signal (STOP1) respectively, torsion measuring means (28/30,32/34) for producing a torsion signal (TS) which is a measure for a torque necessary for the drive, a signal processing unit (42) for producing at least the first stop signal (STOP1) in response to the torsion signal (TS), characterized in that the signal processing unit (42) comprises: first differentiating means (56) for differentiating the torsion signal (TS) and for producing a once differentiated torsion signal (DTS), first comparing means (62) for comparing a decision signal (DES) with a reference signal (REF1) and for producing the first stop signal (STOP1) if the decision signal (DES) exceeds the reference signal (REF1), and wherein the once differentiated torsion signal (DTS) functions as the decision signal (DES), wherein the signal processing unit (42) further includes: means for producing a second stop signal (STOP2) after elapse of a first predetermined time interval which starts running when the start signal (START) occurs.

6. A food processor comprising a motor (18), a bowl (10) and a beater (12) which are movable relative to each other by a drive by the motor (18), a switching device (48) for switching the motor (18) on and off under the control of a start signal (START) and at least a first stop signal (STOP1) respectively, torsion measuring means (28/30,32/34) for producing a torsion signal (TS) which is a measure for a torque necessary for the drive, a signal processing unit (42) for producing at least the first stop signal (STOP1) in response to the torsion signal (TS), characterized in that the signal processing unit (42) comprises: first differentiating means (56) for differentiating the torsion signal (TS) and for producing a once differentiated torsion signal (DTS), first comparing means (62) for comparing a decision signal (DES) with a reference signal (REF1) and for producing the first stop signal (STOP1) if the decision signal (DES) exceeds the reference signal (REF1), and wherein the once differentiated torsion signal (DTS) functions as the decision signal (DES), wherein the signal processing unit (42) further includes: second comparing means (70) for comparing the torsion signal (TS) with a second reference signal (REF2) and for producing a third stop signal (STOP3) if the torsion signal (TS) exceeds the second reference signal (REF2).

7. A food processor comprising a motor (18), a bowl (10) and a beater (12) which are movable relative to each other by a drive by the motor (18), a switching device (48) for switching the motor (18) on and off under the control of a start signal (START) and at least a first stop signal (STOP1) respectively, torsion measuring means (28/30,32/34) for producing a torsion signal (TS) which is a measure for a torque necessary for the drive, a signal processing unit (42) for producing at least the first stop signal (STOP1) in response to the torsion signal (TS), characterized in that the signal processing unit (42) comprises: first differentiating means (56) for differentiating the torsion signal (TS) and for producing a once differentiated torsion signal (DTS), first comparing means (62) for comparing a decision signal (DES) with a reference signal (REF1) and for producing the first stop signal (STOP1) if the decision signal (DES) exceeds the reference signal (REF1), and wherein the once differentiated torsion signal (DTS) functions as the decision signal (DES), wherein the signal processing unit (42) further includes: storage means (80,86) for storing a background signal (BGS) which has a value corresponding to an instantaneous value of the torsion signal (TS) during a second predetermined time interval which starts running when the start signal (START) occurs and a differential amplifier (88) for producing a corrected torsion signal (TSC) which is the difference between the torsion signal (TS) and the background signal (BGS), while the corrected torsion signal (TSC) substitutes for the torsion signal (TS) after the second predetermined time interval has elapsed.

8. A food processor as claimed in claim 7, characterized in that the signal processing unit (42) further includes: multiplier means (60) for multiplying the twice differentiated torsion signal (DDTS) of the second differentiating means (58) by the corrected torsion signal (TSC) and for producing a product signal (PS) which is the result of the multiplication and in that the product signal (PS) in lieu of the twice differentiated signal (DDTS) functions as the decision signal (DES).

9. A food processor comprising a motor (18), a bowl (10) and a beater (12) which are movable relative to each other by a drive by the motor (18), a switching device (48) for switching the motor (18) on and off under the control of a start signal (START) and at least a first stop signal (STOP1) respectively, torsion measuring means (28/30,32/34) for producing a torsion signal (TS) which is a measure for a torque necessary for the drive, a signal processing unit (42) for producing at least the first stop signal (STOP1) in response to the torsion signal (TS), characterized in that the signal processing unit (42) comprises: (a) first differentiating means (56) for differentiating the torsion signal (TS) and for producing a once differentiated torsion signal (DTS), first comparing means (62) for comparing a decision signal (DES) with a reference signal (REF1) and for producing the first stop signal (STOP1) if the decision signal (DES) exceeds the reference signal (REF1), (b) second differentiating means (58) for differentiating once again the once differentiated torsion signal (DTS) of the first differentiating means (56) and for producing a twice differentiated torsion signal (DDTS), and the twice differentiated torsion signal (DDTS) in lieu of the once differentiated torsion signal (DTS) functions as the decision signal (DES), and (c) means for producing a second stop signal (STOP2) after elapse of a first predetermined time interval which starts running when the start signal (START) occurs.

10. A food processor as claimed in claim 3 wherein the signal processing unit (42) further includes: means for producing a second stop signal (STOP2) after elapse of a first predetermined time interval which starts running when the start signal (START) occurs.

11. A food processor as claimed in claim 4 wherein the signal processing unit (42) further includes: means for producing a second stop signal (STOP2) after elapse of a first predetermined time interval which starts running when the start signal (START) occurs.

12. A food processor comprising a motor (18), a bowl (10) and a beater (12) which are movable relative to each other by a drive by the motor (18), a switching device (48) for switching the motor (18) on and off under the control of a start signal (START) and at least a first stop signal (STOP1) respectively, torsion measuring means (28/30,32/34) for producing a torsion signal (TS) which is a measure for a torque necessary for the drive, a signal processing unit (42) for producing at least the first stop signal (STOP1) in response to the torsion signal (TS), characterized in that the signal processing unit (42) comprises: (a) first differentiating means (56) for differentiating the torsion signal (TS) and for producing a once differentiated torsion signal (DTS), first comparing means (62) for comparing a decision signal (DES) with a reference signal (REF1) and for producing the first stop signal (STOP1) if the decision signal (DES) exceeds the reference signal (REF1), (b) second differentiating means (58) for differentiating once again the once differentiated torsion signal (DTS) of the first differentiating means (56) and for producing a twice differentiated torsion signal (DDTS), and the twice differentiated torsion signal (DDTS) in lieu of the once differentiated torsion signal (DTS) functions as the decision signal (DES), and (c) second comparing means (70) for comparing the torsion signal (TS) with a second reference signal (REF2) and for producing a third stop signal (STOP3) if the torsion signal (TS) exceeds the second reference signal (REF2).

13. A food processor as claimed in claim 3 wherein the signal processing unit (42) further includes: second comparing means (70) for comparing the torsion signal (TS) with a second reference signal (REF2) and for producing a third stop signal (STOP3) if the torsion signal (TS) exceeds the second reference signal (REF2).

14. A food processor as claimed in claim 4 wherein the signal processing unit (42) further includes: second comparing means (70) for comparing the torsion signal (TS) with a second reference signal (REF2) and for producing a third stop signal (STOP3) if the torsion signal (TS) exceeds the second reference signal (REF2).

15. A food processor as claimed in claim 5 wherein the signal processing unit (42) further includes: second comparing means (70) for comparing the torsion signal (TS) with a second reference signal (REF2) and for producing a third stop signal (STOP3) if the torsion signal (TS) exceeds the second reference signal (REF2).

16. A food processor comprising a motor (18), a bowl (10) and a beater (12) which are movable relative to each other by a drive by the motor (18), a switching device (48) for switching the motor (18) on and off under the control of a start signal (START) and at least a first stop signal (STOP1) respectively, torsion measuring means (28/30,32/34) for producing a torsion signal (TS) which is a measure for a torque necessary for the drive, a signal processing unit (42) for producing at least the first stop signal (STOP1) in response to the torsion signal (TS), characterized in that the signal processing unit (42) comprises: (a) first differentiating means (56) for differentiating the torsion signal (TS) and for producing a once differentiated torsion signal (DTS), first comparing means (62) for comparing a decision signal (DES) with a reference signal (REF1) and for producing the first stop signal (STOP1) if the decision signal (DES) exceeds the reference signal (REF1), (b) second differentiating means (58) for differentiating once again the once differentiated torsion signal (DTS) of the first differentiating means (56) and for producing a twice differentiated torsion signal (DDTS), and the twice differentiated torsion signal (DDTS) in lieu of the once differentiated torsion signal (DTS) functions as the decision signal (DES), and (c) storage means (80,86) for storing a background signal (BGS) which has a value corresponding to an instantaneous value of the torsion signal (TS) during a second predetermined time interval which starts running when the start signal (START) occurs and a differential amplifier (88) for producing a corrected torsion signal (TSC) which is the difference between the torsion signal (TS) and the background signal (BGS), while the corrected torsion signal (TSC) substitutes for the torsion signal (TS) after the second predetermined time interval has elapsed.

17. A food processor as claimed in claim 3 wherein the signal processing unit (42) further includes storage means (80, 86) for storing a background signal (BGS) which has a value corresponding to an instantaneous value of the torsion signal (TS) during a second predetermined time interval which starts running when the start signal (START) occurs and a differential amplifier (88) for producing a corrected torsion signal (TSC) which is the difference between the torsion signal (TS) and the background signal (BGS), whilst the corrected torsion signal (TSC) substitutes for the torsion signal (TS) after the second predetermined time interval has elapsed.

18. A food processor as claimed in claim 4 wherein the signal processing unit (42) further includes storage means (80, 86) for storing a background signal (BGS) which has a value corresponding to an instantaneous value of the torsion signal (TS) during a second predetermined time interval which starts running when the start signal (START) occurs and a differential amplifier (88) for producing a corrected torsion signal (TSC) which is the difference between the torsion signal (TS) and the background signal (BGS), whilst the corrected torsion signal (TSC) substitutes for the torsion signal (TS) after the second predetermined time interval has elapsed.

19. A food processor as claimed in claim 5 wherein the signal processing unit (42) further includes storage means (80, 86) for storing a background signal (BGS) which has a value corresponding to an instantaneous value of the torsion signal (TS) during a second predetermined time interval which starts running when the start signal (START) occurs and a differential amplifier (88) for producing a corrected torsion signal (TSC) which is the difference between the torsion signal (TS) and the background signal (BGS), whilst the corrected torsion signal (TSC) substitutes for the torsion signal (TS) after the second predetermined time interval has elapsed.

20. A food processor as claimed in claim 6 wherein the signal processing unit (42) further includes storage means (80, 86) for storing a background signal (BGS) which has a value corresponding to an instantaneous value of the torsion signal (TS) during a second predetermined time interval which starts running when the start signal (START) occurs and a differential amplifier (88) for producing a corrected torsion signal (TSC) which is the difference between the torsion signal (TS) and the background signal (BGS), whilst the corrected torsion signal (TSC) substitutes for the torsion signal (TS) after the second predetermined time interval has elapsed.

\* \* \* \* \*